April 13, 1965 R. F. STEPHENS 3,177,692

ARTICLE FORMING APPARATUS

Filed Dec. 22, 1961 3 Sheets-Sheet 1

INVENTOR
R. F. STEPHENS
BY A. C. Schwarz, Jr.
ATTORNEY

INVENTOR
R.F. STEPHENS
BY A. C. Schwarz, Jr.
ATTORNEY

INVENTOR
R. F. STEPHENS
BY A. C. Schwarz, Jr.
ATTORNEY

United States Patent Office 3,177,692 Patented Apr. 13, 1965

3,177,692

ARTICLE FORMING APPARATUS

Ralph F. Stephens, Carmel, Ind., assignor to Western Electric Company, Incorporated, a corporation of New York Filed Dec. 22, 1961, Ser. No. 161,613
9 Claims. (Cl. 72—323)

This invention relates to article forming apparatus, and more particularly to apparatus for performing forming operations on a plurality of coplanar members simultaneously. It is an object of this invention to provide new and improved apparatus of this character.

It is standard practice in the manufacture of certain electrical components to perform forming operations on leads of the component, as for example, forming bends in the leads adjacent their ends. Where the leads extend from one side of a body of the component parallel to one another in a common plane, and where the bends in the leads must be formed in the common plane and in alternate ones of the leads at different points along their lengths, it is extremely difficult to form the bends in the leads simultaneously because adjacent leads interfere with one another during the forming operation. On the other hand, to form the bends in the leads individually is relatively inefficient, uneconomical and time consuming, especially where a large number of components are being manufactured.

Accordingly, another object of this invention is to provide new and improved apparatus for forming parallel coplanar leads of an electrical component rapidly and economically.

A further object of this invention is to provide new and improved apparatus for forming a plurality of parallel coplanar elongated members at different spaced points along their lengths simultaneously.

A still further object of this invention is to provide new and improved apparatus for performing one type of forming operation on selected ones of a plurality of parallel coplanar elongated members at selected points along their lengths, and simultaneously therewith performing a different type of forming operation on the other elongated members at selected points along their lengths.

In accordance with the invention, a plurality of elongated coplanar members, as for example multiple wire leads of an electrical component, are deflected laterally relative to one another into different planes to position the members adjacent corresponding first and second spaced forming members. A third forming member then is moved relative to the first and second spaced forming members and cooperates therewith to form the elongated members, whereupon the formed elongated members are permitted to return to their coplanar positions.

In a preferred embodiment of the invention, coplanar wire leads of an electrical component are supported in elongated slots in a base member with the wire leads extending beyond open ends of the slots and with selected ones of the leads adjacent first bending edges or anvils at the ends of the slots. The other leads then are deflected laterally in the slots out of the common plane of the leads by a deflecting bar, to position the other leads adjacent second bending edges or anvils spaced from the first anvils in directions extending laterally and longitudinally with respect to the leads. A bending member mounted for linear movement in the base member and including a single bending surface for each set of anvils, then is moved transversely with respect to the slots to bend the leads about their corresponding anvils. Subsequently, the deflecting bar is removed and the formed deflected leads are permitted to return to their original positions.

This invention, together with further objects and advantages thereof will best be understood by reference to the following detailed description taken in connection with the accompanying drawings in which.

Figure 1:
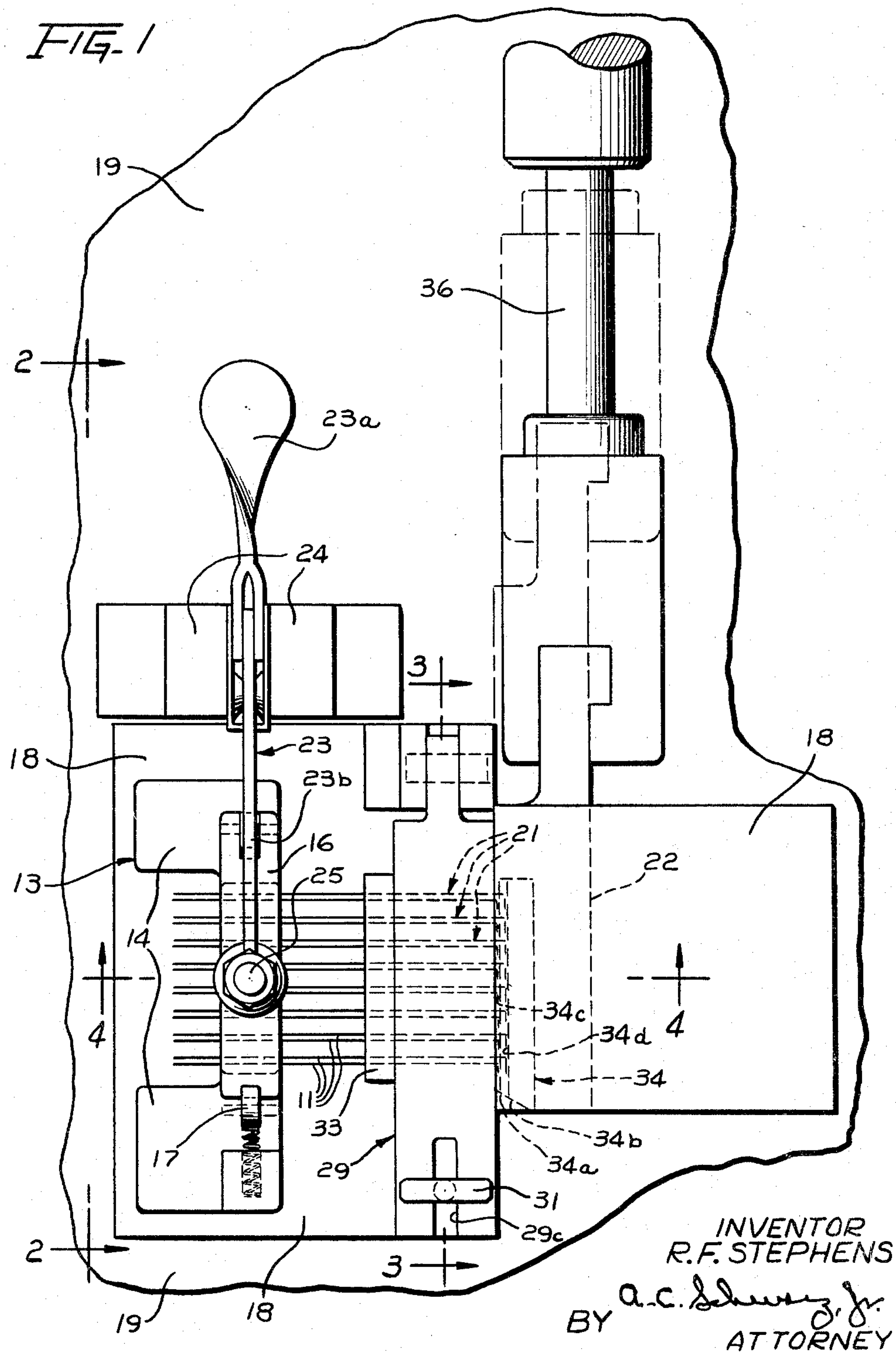
FIG. 1 is a plan view of the article forming apparatus in a first operating position.
Figure 4:
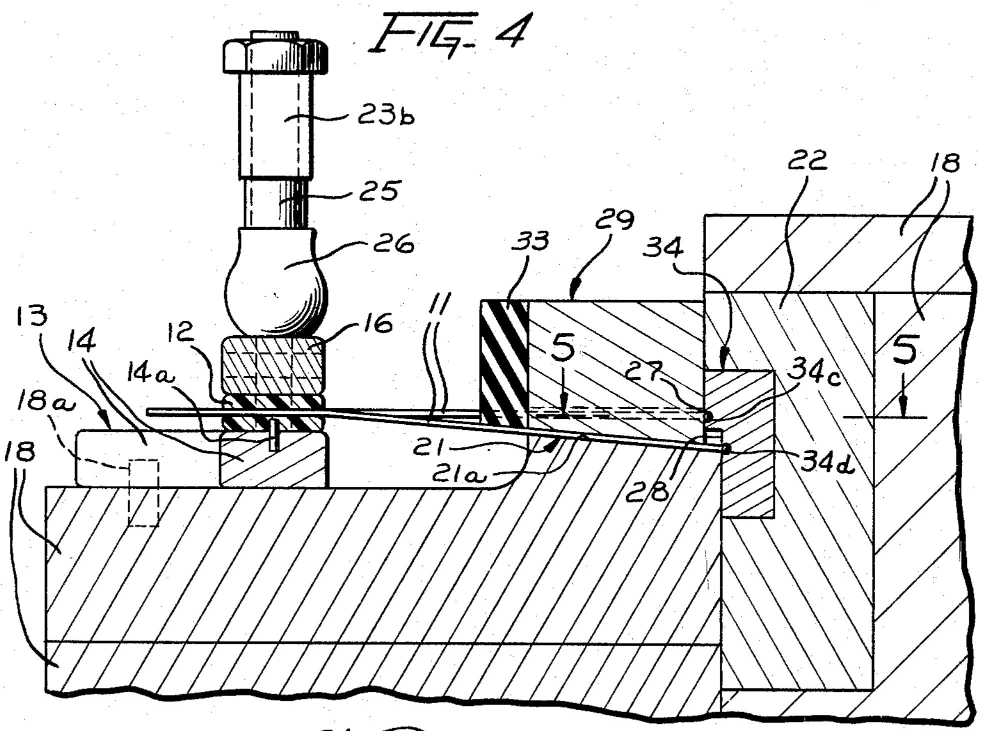
FIG. 4 is a cross-sectional view taken substantially along the line 4—4 of FIG. 1.
Figure 5:
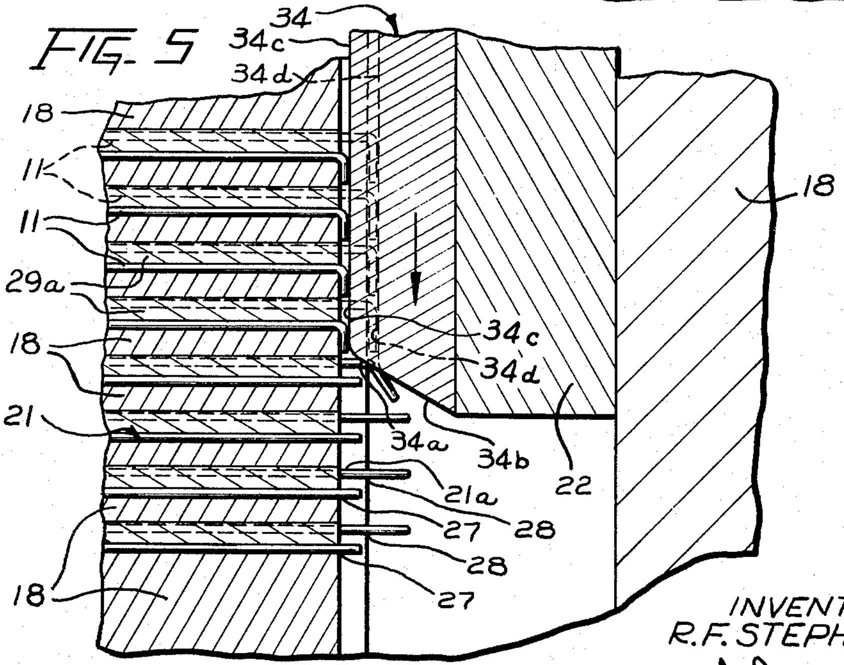
FIG. 5 is a cross-sectional view taken substantially along the line 5—5 of FIG. 4, but showing certain operating members of the article forming apparatus in a second operating position.

Referring to FIGS. 1, 4 and 5, it is seen that the illustrated embodiment of the invention is designed to form 90° bends adjacent the ends of leads 11 of an electrical component at different points along the lengths of the leads. The leads 11 are embedded in an insulating block 12 (FIG. 4) of the component and normally project from one side of the block 12 parallel to one another in a common plane, and the 90° bends are formed in the leads in this plane so that alternate ones of the formed leads are of greater lengths than the other formed leads.

Figure 2:
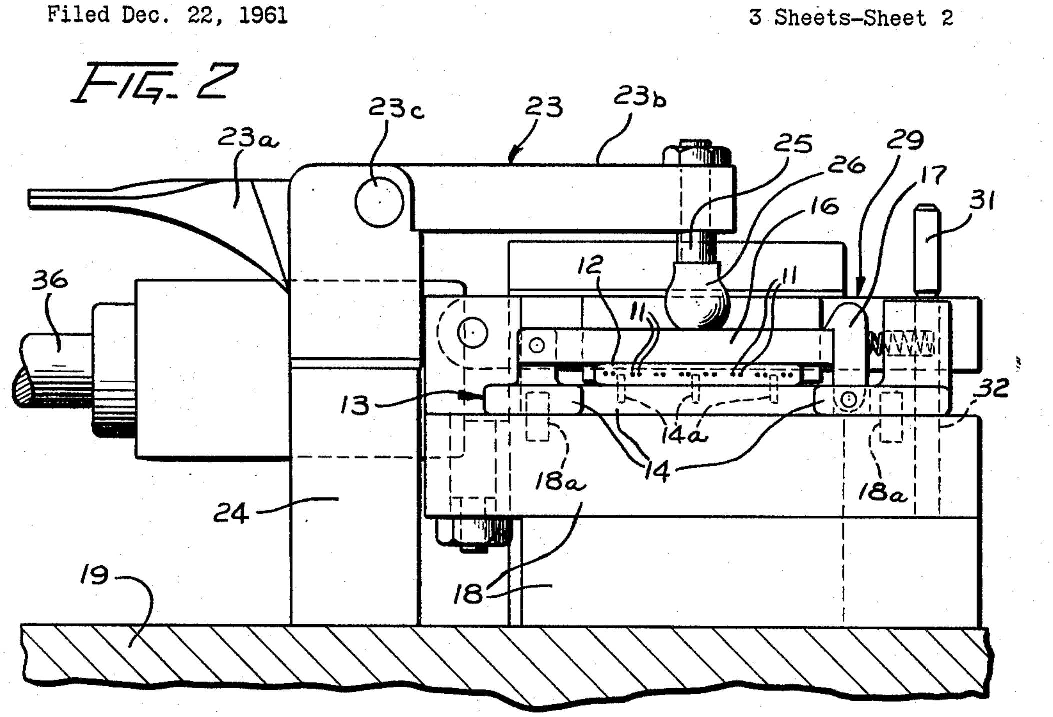
FIG. 2 is a cross-sectional view taken substantially along the line 2—2 of FIG. 1.

In the illustrated embodiment of the invention, the insulating block 12 of the electrical component is clamped in a clamping assembly 13 which is designed to be removably mounted in the apparatus so as to be transferable to and from other fixtures (not shown), with the electrical component therein, for other processing operations. The clamping assembly 13 includes a channel-shaped support block 14, which may include a plurality of upstanding positioning lugs or dowel pins 14*a* (FIGS. 2 and 4) designed to be received in corresponding recesses in the insulating block 12 to facilitate positioning and securing of the insulating block in the clamping assembly. A clamping bar 16 is pivotally mounted at one end on an upstanding lug on the support block 14, and a latch 17 is pivotally mounted on the support block adjacent the free end of the clamping bar, and is biased counterclockwise (FIG. 2) by a coil spring positioned in a recess in another upstanding lug on the support block. As is best shown in FIG. 2, when the clamping bar 16 is rotated clockwise and is forced past the spring biased latch 17, the latch pivots counterclockwise to lock the clamping bar in clamping position with respect to the electrical component.

To form the 90° bends in the leads 11, the clamping assembly 13 with the electrical component clamped therein is positioned in the apparatus on a base 18 suitably secured to a work table 19, so that the leads 11 are disposed in horizontal open-ended slots 21 in an upwardly projecting portion of the base 18, and so that the leads 11 extend beyond the right-hand ends of the horizontal slots, as viewed in FIGS. 1, 4 and 5, into the path of a horizontally reciprocating slide 22 subsequently to be described. To facilitate positioning of the clamping assembly 13 and the electrical component clamped therein in the apparatus in this manner, the base 18 includes a pair of upstanding positioning lugs or dowel pins 18*a* (FIGS. 2 and 4) designed to be received in corresponding recesses in the support block 14.

A clamp 23 is provided for securing the clamping assembly 13 and the electrical component clamped therein in the apparatus, and includes a handle 23*a* and a lever 23*b* both pivoted on a pin 23*c* at the upper end of an upstanding support 24 fixedly secured at its lower end to the work table 19. A pin 25 is mounted on the free end of the lever 23*b* by a suitable threaded nut member and includes a rounded member 26 fixedly mounted on its lower end. When the handle 23*a* is rotated counterclockwise, as viewed in FIG. 2, suitable mechanism (not shown) associated therewith rotates the lever 23*b* clockwise to move the rounded member 26 into clamping engagement with the clamping assembly 13, as shown.

Figure 3:
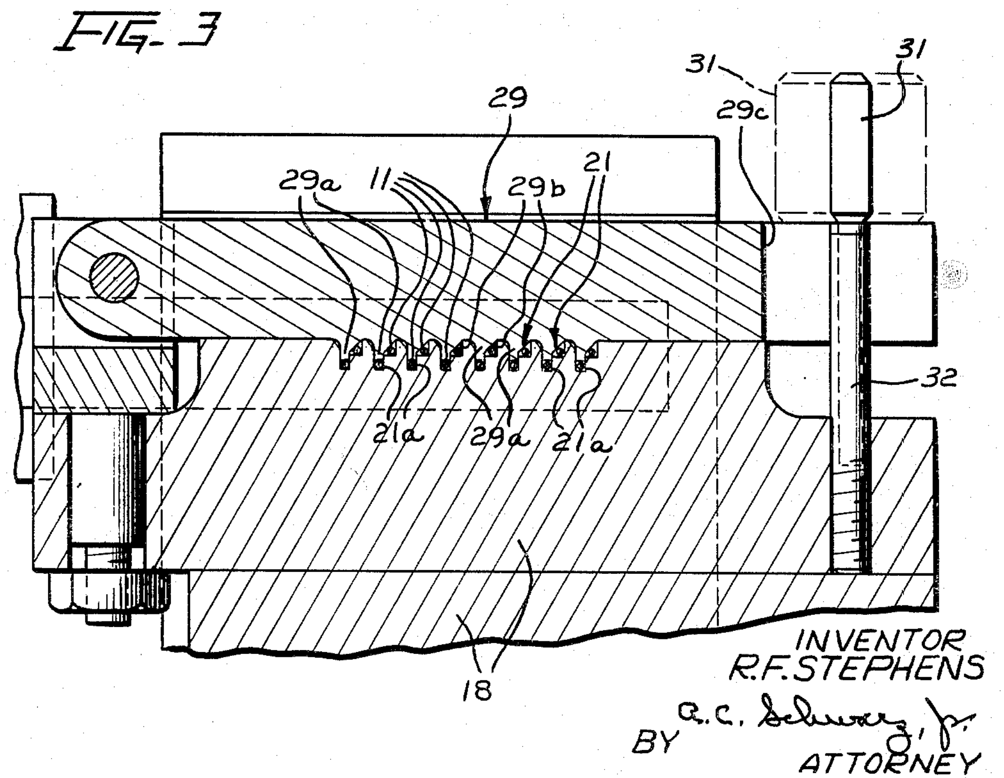
FIG. 3 is a cross-sectional view taken substantially along the line 3—3 of FIG. 1.

As is best shown in FIG. 3, each of the horizontal slots 21 is designed to receive a pair of adjacent ones of the leads 11, with a portion 21*a* of the slot being of a greater depth than the remainder of the slot. The bottom of each slot portion 21*a* tapers downwardly to the right (FIG. 4) and, as is best shown in FIGS. 4 and 5, each slot portion 21*a* extends beyond the right-hand end of its associated slot 21. Thus, vertical edges of the base 18 defining the right-hand end (FIGS. 4 and 5) of each slot 21 and its lower slot portion 21*a* form corresponding bending edges or anvils 27 and 28, with the anvil 28 being spaced from the anvil 27 laterally and longitudinally with respect to the slot 21, and with the anvils 27 being in a common vertical plane and the anvils 28 being in a common vertical plane.

Above the slots 21, as is best shown in FIG. 3, a bar 29, for depressing one of the leads 11 in each of the slots 21 into the lower slot portion 21*a* thereof, is pivotally mounted at one end on an upstanding lug member bolted to the base 18. The lower side of the bar 29 includes a plurality of downwardly extending spaced projections 29*a* each designed to be received in a corresponding one of the slots 21 and each having a tapered bottom surface (FIG. 4) substantially corresponding to the tapered bottom surface of the associated lower slot portion 21*a*. When the bar 29 is pivoted clockwise, as viewed in FIG. 3, either manually or by a suitable mechanism (not shown), a tapered camming surface 29*b* on each of the projections 29*a* engages one of the leads 11 in the associated slot 21 to firmly clamp the lead adjacent the anvil 27 at the end of the slot, and the bottom surface of the projection 29*a* engages the other lead in the slot to depress this lead firmly against the bottom of the lower slot portion 21*a* of the slot and into a position adjacent the anvil 28 at the end of the slot.

The lead depressing bar 29 includes a slot 29*c* at its free end designed to receive a locking member 31 rotatably mounted on the upper end of an upstanding pin 32 screw threaded at its lower end into the base 18. After the bar 29 has been moved downward to clamp and to depress the leads 11, as above described, the locking member 31 is rotated through 90° (FIG. 1) to lock the bar in its lead clamping and lead depressing position. A guard 33 of soft rubber, or other suitable material, may be provided on the lead depressing bar 29 to prevent the left-hand lower edge (FIG. 4) of the bar from scratching or nicking the leads 11.

As is best shown in FIGS. 1, 4 and 5, the above mentioned horizontally reciprocating slide 22 is mounted in a guideway in the base 18 for movement transversely with respect to the slots 21, and is provided at one end with an insert 34 of a suitable wear material, such as carbide, the insert being movable with the slide adjacent the anvils 27 and 28. The wear insert 34 is provided with tapered lead bending surfaces 34*a* and 34*b*, and the surfaces of the insert facing the anvils 27 and 28 are movable in the common vertical planes thereof and include upper and lower longitudinally extending slots 34*c* and 34*d* for receiving bent over portions of the leads 11. The other end of the slide 22 is suitably connected to a horizontally reciprocating piston rod 36 (FIG. 1) of an air cylinder mounted on the work table 19 in any suitable manner. As is best shown in FIG. 5, when the piston rod 36 moves the slide 22 in the direction indicated by the arrow, the bending surfaces 34*a* and 34*b* on the insert 34 cooperate with the anvils 27 and 28 on the base 18 to form sequentially the 90° bends in the ends of the leads 11.

After the 90° bends have been formed in the leads 11, the locking member 31 is rotated 90° to a position in which it can enter the slot 29*c* in the free end of the lead depressing bar 29, and the bar 29 is raised manually to permit the leads 11 which have been depressed thereby to spring back to their original positions. The clamp 23 then is released by pivoting the handle 23*a* thereof clockwise (FIG. 2) so that the above mentioned mechanism (not shown) associated therewith pivots the lever 23*b* counterclockwise, thereby releasing the clamping assembly 13. The clamping assembly 13 with the electrical component therein then is removed from the apparatus, whereupon a new clamping assembly and component is positioned in the apparatus and the above cycle of operation is repeated.

While the illustrated embodiment of the invention is shown as forming 90° bends in the component leads 11, it is contemplated that the apparatus could be modified and used to sever the ends of the leads, as for example, by eliminating the slots 34*c* and 34*d* in the wear insert 34 and by constructing the bending surfaces 34*a* and 34*b* on the wear insert and the anvils 27 and 28 on the base 18 as cooperating lead cutting elements. Similarly, it is contemplated that only one set of the bending elements, as for example the anvils 27 and the bending surface 34*a*, could be constructed as cooperating lead cutting elements, whereby the apparatus could be used to sever the ends of selected component leads and simultaneously therewith form 90° bends in other component leads. In this regard, it is further contemplated that the ends of the slots 21 and the lower slot portions 21*a* could terminate in the same vertical plane, rather than in longitudinally spaced relationship.

From the foregoing description, it is apparent that the lead depressing bar 29 can be used to deflect certain of the component leads 11 out of the common plane in which the leads are disposed, whereby upon movement of the slide 22 the bending surfaces 34*a* and 34*b* thereon cooperate with the anvils 27 and 28 on the base 18 to form 90° bends in the leads at different points along their lengths simultaneously. Similarly, the apparatus readily can be modified for severing the leads 11 at different points along their lengths by constructing the lead bending elements 27, 34*a* and 28, 34*b* as lead cutting elements. Further, by constructing only one of the sets of bending elements 27, 34*a* or 28, 34*b* as lead cutting elements, the apparatus can be used to form bends in certain of the leads 11 and simultaneously therewith to sever other leads adjacent their ends.

While certain embodiments of the invention have been disclosed many modifications will be apparent, and it is intended that the invention be interpreted as including all modifications which fall within the true spirit and scope of the invention.

What is claimed is:

1. Apparatus for forming coplanar members, which comprises:

first and second spaced forming means;

means for supporting members, which are disposed in a common plane, so that certain of the members are positioned adjacent said first forming means;

movable means for moving selected ones of the members out of the common plane to position the selected members adjacent said second forming means, and being movable so that the selected members can return to their original positions in the common plane after being formed; and third forming means movable relative to said first and second forming means and cooperable therewith to form the members simultaneously.

2. Apparatus for forming coplanar elongated members, which comprises:

a base member including a plurality of slots having open ends;

first and second spaced forming means on said base member at the open ends of the slots;

means for supporting elongated members, which are disposed in a common plane, in the slots with the members extending beyond the open ends of the slots and with certain of the members extending adjacent said first forming means;

movable means for moving selected ones of the members laterally in the slots out of the common plane of the members to position the selected members adjacent said second forming means, and being movable so that the selected members can return to their original positions in the common plane after being formed; and third forming means mounted for linear movement in said base member relative to said first and second forming means transversely with respect to the slots and cooperable with said first and second forming means to form the members simultaneously.

3. Apparatus for forming coplanar elongated members, which comprises:

a base member including a plurality of slots having open ends;

first and second spaced forming means on said base member at the open ends of the slots;

means for supporting elongated members, which are disposed in a common plane, in the slots with the members extending beyond the open ends of the slots and with certain of the members extending adjacent said first forming means;

a movable bar including a plurality of spaced projections for engaging and moving selected ones of the members laterally in the slots out of the common plane of the members to position the selected members adjacent said second forming means, said bar being movable so that the selected members can return to their original positions in the common plane after being formed;

releasable means for holding said bar in a position in which said bar holds the selected members adjacent said second forming means; and third forming means movable relative to said first and second forming means transversely with respect to the slots and cooperable with said first and second forming means to form the members simultaneously.

4. Apparatus for forming coplanar elongated members at different points along their lengths, which comprises:

first forming means;

second forming means spaced from said first forming means in directions extending laterally and longitudinally with respect to the members;

means for supporting elongated members, which are disposed in a common plane, so that certain of the members are positioned adjacent said first forming means;

movable means for moving selected ones of the members out of the common plane of the members to position the selected members adjacent said second forming means, and being movable so that the selected members can return to their original positions in the common plane after being formed; and third forming means movable relative to said first and second forming means and cooperable with said first and second forming means to form the members simultaneously.

5. Apparatus for forming coplanar elongated members at different points along their lengths, which comprises:

a base member including a plurality of slots having open ends;

first forming means on said base member at the open ends of the slots;

second forming means on said base member at the open ends of the slots spaced from said first forming means in directions extending laterally and longitudinally with respect to the slots;

means for supporting elongated members, which are disposed in a common plane, in the slots with the members extending beyond the open ends of the slots and with certain of the members extending adjacent said first forming means;

movable means for moving selected ones of the members laterally in the slots out of the common plane of the members to position the selected members adjacent said second forming means, and being movable so that the selected members can return to their original positions in the common plane after being formed; and third forming means mounted for linear movement in said base member relative to said first and second forming means transversely with respect to the slots and cooperable with said first and second forming means to form the members simultaneously.

6. Apparatus for forming coplanar elongated members at different points along their lengths, which comprises:

a base member including a plurality of substantially parallel slots having open ends;

first forming means on said base member at the open ends of the slots;

second forming means on said base member at the open ends of the slots spaced from said first forming means in directions extending laterally and longitudinally with respect to the slots;

means for supporting elongated members, which are disposed in a common plane, in the slots with the members extending beyond the open ends of the slots and with certain of the members extending adjacent said first forming means;

a movable bar including a plurality of spaced projections for engaging and moving selected ones of the members laterally in the slots out of the common plane of the members to position the selected members adjacent said second forming means, said bar being movable so that the selected members can return to their original positions in the common plane after being formed;

releasable means for holding said bar in a position in which said bar holds the selected members adjacent said second forming means; and third forming means movable relative to said first and second forming means transversely with respect to the slots and cooperable with said first and second forming means to form the members simultaneously.

7. Apparatus for bending coplanar elongated members at different points along their lengths, which comprises:

a base member including a plurality of substantially parallel slots having open ends;

first anvils on said base member at the open ends of the slots;

second anvils on said base member at the open ends of the slots and space from said first anvils in directions extending laterally and longitudinally with respect to the slots;

means for supporting elongated members, which are disposed in a common plane, in the slots with the members extending beyond the open ends of the slots and with certain of the members extending adjacent said first anvils;

a movable bar including a plurality of spaced projections for engaging and moving selected ones of the members laterally in the slots out of the common plane of the members to position the selected members adjacent said second anvils, said bar being movable so that the selected members can return to their original positions in the common plane after being bent;

releasable means for holding said bar in a position in which said bar holds the selected members adjacent said second anvils; and a bending member mounted for linear movement in said base member relative to said first and second anvils transversely with respect to the slots to bend the members about their corresponding anvils simultaneously.

8. Apparatus for bending coplanar parallel leads of an electrical component at diffferent points along their lengths, which comprises:

a base member including a plurality of substantially parallel slots having open ends;

first anvils formed by edges on said base member at the open ends of the slots;

second anvils formed by edges on said base member at the open ends of the slots and spaced from said first anvils in directions extending laterally and longitudinally with respect to the slots;

means for supporting an electrical component so that parallel leads of the component, which are disposed in a common plane, are positioned in the slots and extend beyond the open ends of the slots with selected ones of the leads extending adjacent said first anvils;

a pivoted bar including a plurality of spaced projections for clamping the selected leads adjacent said first anvils and for engaging and moving the other leads laterally in the slots out of the common plane of the leads to position and clamp the other leads adjacent said second anvils, said bar being movable so that the leads adjacent said second anvils can return to their positions in the common plane after being bent;

releasable means for holding said bar in position in which said bar holds the leads adjacent their corresponding anvils;

a bending member mounted for linear movement in said base member transversely with respect to the slots and adjacent said anvils, said bending member including a single bending surface for bending the leads adjacent said first anvils and a single bending surface for bending the leads adjacent said second anvils, with the bending surfaces including slots extending in the direction of movement of the bending member for receiving bent over portions of the leads; and means for moving said bending member to bend the leads about their corresponding anvils.

9. Apparatus for forming coplanar members, which comprises:

a plurality of first forming means disposed in a common plane;

a plurality of second forming means spaced from said first forming means and disposed in a common plane;

means for supporting members, which are disposed in a common plane, so that certain of the members are positioned adjacent said first forming means;

means for moving selected ones of the members out of the common plane of the members to position the selected members adjacent said second forming means; and third forming means movable relative to said first and second forming means and cooperable therewith to form the members simultaneously, said third forming means including a forming element movable in the common plane of said first forming means for forming the members adjacent said first forming means, and a forming element movable in the common plane of said second forming means for forming the members adjacent said second forming means.

References Cited by the Examiner

UNITED STATES PATENTS

| | | | |
|---|---|---|---|
| 227,804 | 5/80 | Martyn. | |
| 1,448,567 | 3/23 | Muller et al. | |
| 2,873,787 | 2/59 | Runge | 153—25 |

WILLIAM J. STEPHENSON, *Primary Examiner.*

CHARLES W. LANHAM, *Examiner.*